United States Patent
Chong et al.

(10) Patent No.: US 11,808,246 B2
(45) Date of Patent: Nov. 7, 2023

(54) METHOD FOR FORMING AN ADD-ON COMPONENT FOR AN AEROFOIL

(71) Applicant: Brunel University London, Uxbridge (GB)

(72) Inventors: Tze Pei Chong, Uxbridge (GB); Philip Charles Woodhead, Uxbridge (GB)

(73) Assignee: Brunel University London, Uxbridge (GB)

( * ) Notice: Subject to any disclaimer, the term of this patent is extended or adjusted under 35 U.S.C. 154(b) by 78 days.

(21) Appl. No.: 17/526,808

(22) Filed: Nov. 15, 2021

(65) Prior Publication Data
US 2022/0074383 A1 Mar. 10, 2022

Related U.S. Application Data

(63) Continuation of application No. PCT/GB2020/051178, filed on May 14, 2020.

(30) Foreign Application Priority Data

May 16, 2019 (GB) ..................... 1906920

(51) Int. Cl.
*F03D 1/06* (2006.01)

(52) U.S. Cl.
CPC .... *F03D 1/0675* (2013.01); *F05B 2240/3042* (2020.08); *F05B 2250/182* (2013.01); *F05B 2250/183* (2013.01); *F05B 2260/96* (2013.01)

(58) Field of Classification Search
CPC ............ F03D 1/0675; F05B 2240/3042; F05B 2250/182; F05B 2250/183; F05B 2260/96; F05B 2260/964
See application file for complete search history.

(56) References Cited

U.S. PATENT DOCUMENTS

| 10,301,942 B2 * | 5/2019 | Joseph ................... F01D 5/141 |
| 2012/0027590 A1 | 2/2012 | Bonnet |
| 2017/0022820 A1 | 1/2017 | Subramanian et al. |
| 2017/0174320 A1 | 6/2017 | Beckman et al. |

FOREIGN PATENT DOCUMENTS

| CN | 109292076 A | 2/2019 |
| EP | 3205874 A1 | 8/2017 |
| WO | 2017220594 A1 | 12/2017 |
| WO | 2019158876 A1 | 8/2019 |

OTHER PUBLICATIONS

Gruber et al. "Airfoil trailing edge noise reduction by the introduction of sawtooth and slitted trailing edge geometries" (Proceedings of 20th International Congress on Acoustics, ICA 2010).
International Search Report and Written Opinion dated Nov. 17, 2020 issued in connection with International Application PCT/GB2020/051178.

\* cited by examiner

*Primary Examiner* — Brian O Peters
(74) *Attorney, Agent, or Firm* — Cook Alex Ltd.

(57) ABSTRACT

A method is provided for forming an add-on component for an aerofoil which enable the structure of the aerofoil to be tuned in order to reduce the amplitude of sound produced at frequency $f_{peak}$ when air flows in a flow direction from the leading edge over the trailing edge of an aerofoil. The method applies both to add-on components having a slitted formation and a Double-Rooted Trailing Edge Serration (abbreviated to "DRooTES").

20 Claims, 12 Drawing Sheets

DRooTES - Double Rooted Trailing Edge Serration

Slit Trailing Edge

METHOD FOR FORMING AN ADD-ON COMPONENT FOR AN AEROFOIL

CROSS-REFERENCE TO RELATED APPLICATIONS

This application is a continuation of International Application No. PCT/GB2020/051178 filed on May 14, 2020, entitled "A Method For Forming An Add-On Component For An Aerofoil" which, in turn, claims priority benefits from UK Application No. 1906920.2 filed on May 16, 2019. The '178 and '920.2 applications are hereby incorporated by reference herein in their entireties.

FIELD OF THE INVENTION

The present application relates to a method for forming an add-on component for an aerofoil, and to a method for reducing the amplitude of sound produced at frequency $f_{peak}$ when air flows in a flow direction from the leading edge over the trailing edge of an aerofoil.

It is widely known that unwanted noise is essentially a form of pollution that affects health and wellbeing, especially near airports and wind farm sites. Studies have shown that both aviation and wind farm noise pollution have adverse health effects resulting in annoyance, sleep disturbance and cognitive impairment. To protect the public, strict noise regulations have been implemented to both the aviation and wind energy sectors. The European Commission outlines aviation targets that in year 2050 aviation noise emission will be reduced by 65% compared to the level produced in 2000. However, civil aviation traffic is expected to expand worldwide between 4% and 5% annually with higher growth in the Middle East and Asia Similarly, Wind Europe issued a report in 2014 on the projected energy capacity scenarios in 2030, where their central scenario outlines that 320 GW electricity will be generated by wind energy and that 78% of this would be produced by onshore wind farms.

The significant growth within the aviation industry and the onshore wind farms in the European Union (EU) member states will inevitably increase the aerodynamic noise pollution. Aircraft noise is mainly caused by the jet engine and high lift devices during take-off and landing. However, development in the technology of jet engines has seen a reduction in jet noise, but an increase in noise generated by the high bypass-ratio fan blades.

Wind turbine mechanical noise is mainly caused by the moving parts inside the gearbox and generator. However, the recent development of high precision gear tooth profile designs and acoustic insulation of casings has reduced the source of mechanical noise. In contrast, the aerodynamic noise generated from the wind turbine blade is more difficult to reduce. To protect local settlements, maximum noise levels are currently set at 35-45 dB(A) at 350 m from the wind turbines. As a result, wind turbine companies often reduce the rotation speed of their turbines in high wind speed scenarios in order to curb the aerodynamic noise level and not exceed the prescribed limit. This practice essentially leads to a lower utilisation of the available wind energy source. Reduction of noise without reducing the rotor-speed would therefore make wind energy cheaper and, hence, a more attractive alternative for fossil energy. In quantitative terms, a further 1 dB noise reduction from the current level could lead to significant increase in wind energy production.

Aerodynamic noise can emanate from the aerofoils' leading and trailing edges. The aerofoil noise is generated either at the leading edge of the blades, through interaction with the atmospheric turbulence, or at the trailing edges, where turbulence in the boundary layer develops on the blade's surface and scatters into sound. Leading edge noise and trailing edge noise are different noise sources and not related to each other. Trailing edge noise (also commonly referred to as self-noise), remains one of the most relevant noise sources related to the aviation and wind turbine industries.

It is known from the prior art that trailing edge noise reduction can be achieved by use of a simple sawtooth trailing edge. First, noise reduction by a serrated trailing edge is partly related to destructive interference caused by a phase lag mechanism of turbulence noise scattering on the slanted/oblique edge. Second, the root of the serrated trailing edge is effective in turbulence noise radiation. Third, two noise sources that are displaced by 180° phase angle in the longitudinal direction, such as the leading edge slit case, have been shown to be able to maximise the destructive interference for the aerodynamic noise reduction.

CN 109292076 A1 (Harbin Inst. Technology) discloses a low self-noise aerofoil structure having a multi-wavelength serrated trailing edge. The aerofoil body is detachably connected to the noise reduction trailing edge plate through a connector.

WO 2017/220594 A1 (LM Wind Power) discloses a wind turbine blade comprising two or more serrations provided along a section of the trailing edge.

US 2012/027590 A1 (Bonnet) discloses a rotor blade assembly and a method for reducing the noise of a rotor blade for a wind turbine.

WO 2019/158876 A1 (Safran Aircraft Engines) discloses a profiled air flow structure comprising a body and acoustically absorbent porous regions.

US 2017/0174320 (Amazon Tech Inc.) discloses systems, methods, and apparatus for actively adjusting the position of one or more propeller blade treatments of a propeller blade of an aerial vehicle during operation of the aerial vehicle.

US 2017/0022820 A1 (Rolls-Royce plc) discloses an aerofoil for a gas turbine which has a series of first and second recesses cut into the leading edge of the aerofoil itself. A formula is given for how to cut the recesses in order to reduce noise at the leading edge of the aerofoil, the formula being:

$$f_0 = U/2h_{tt}$$

where $f_0$ is the frequency of noise that is reduced, U is the velocity of air passing over the leading edge, and $h_{tt}$ is the distance in height of the adjacent troughs of the first and second recesses.

Gruber, Azarpeyvand and Joseph "Airfoil trailing edge noise reduction by the introduction of sawtooth and slitted trailing edge geometries" (Proceedings of 20th International Congress on Acoustics, ICA 2010) compares the measurements of the trailing edge self-noise reduction obtained using sawtooth and slit serrations on a NACA651210 aerofoil.

SUMMARY OF THE INVENTION

The inventive realisation of the present application is that the formula disclosed in US 2017/0022820 A1 is incorrect and that a more accurate formula is as defined in claim 1. Furthermore, it has been discovered that improved results can be obtained by constructing a separate component for an aerofoil according to the inventive formula and attaching it to the aerofoil at the trailing edge of the aerofoil, rather than cutting recesses into the aerofoil itself as in US 2017/0022820 A1.

Furthermore, it has been realised that an equivalent inventive formula can be used to tune the noise reduction obtainable from an aerofoil having slit serrations (as disclosed in Gruber, Azarpeyvand and Joseph referred to above).

In a first aspect of the invention, there is provided a method for forming an add-on component for an aerofoil having a leading edge and a trailing edge, said component being formed in order to reduce the amplitude of sound produced at frequency $f_{peak}$ when air flows in a flow direction from the leading edge of the aerofoil over the trailing edge of the component at a freestream $U_\infty$, the method including the steps of:

(a) selecting a frequency $f_{peak}$ of sound that is to be reduced;
(b) selecting a freestream velocity $U_\infty$ of air;
(c) providing a component having a joining edge for joining to a trailing edge of an aerofoil and a trailing edge opposite said joining edge;
(d) forming the trailing edge of the component into a plurality of pairs of peaks, each of said pairs having a first trough, a first peak, a second trough, a second peak, which is a greater distance from the joining edge than the first peak, and a third trough, wherein the first trough is on one side of the first peak, the second trough is between the first and second peak, and the third trough is on the other side of the second peak to the second trough;
(e) wherein the first and third troughs of each pair of peaks lie substantially on a first axis, the second troughs of each pair of peaks lie substantially on a second axis, and the second peaks of each pair of peaks lie on a third axis;
(f) and wherein the component is formed according to the formula:

$$h' = \frac{\hat{c} \cdot U_\infty \cdot \kappa}{2 f_{peak}},$$

where $\hat{c}$ is from 0.4 to 0.8 and $$\kappa = \left(\frac{h''}{h'}\right)^{0.4}$$

where h' is the shortest distance between the first axis and the second axis, h" is the shortest distance between the 2' and 3' axis, $f_{peak}$, is the frequency of sound to be reduced and $U_\infty$ is the freestream velocity in the flow direction of air flowing over the trailing edge of the component.

In one embodiment, h'=h".

The shortest distance from the first peak to the first axis may be identical for each of said pair of peaks within the plurality of pairs.

The third trough of first pair of peaks may be the first trough of a second pair of peaks which is adjacent to said first pair of peaks.

A method for reducing the amplitude of sound produced at frequency $f_{peak}$ when air flows in a flow direction from the leading edge of an aerofoil over the trailing edge of an aerofoil at freestream velocity $U_\infty$ includes the steps of:

(a) forming an add-on component for an aerofoil according to a method as defined above and
(b) attaching said component to said aerofoil.

The method may additionally include the steps of forming a plurality of components and attaching said plurality of components to said aerofoil. For example, three components may be formed and attached to said aerofoil, the first component proximate the tip of the aerofoil, the second component proximate the middle of the aerofoil and the third component proximate the other end of the aerofoil to the tip.

In one embodiment the components may be identical. However, in an alternative embodiment said components have different values of h' and/or h".

In a second aspect of the invention (which relates to the slits component referred to above), there is provided a method for forming an add-on component for an aerofoil having a leading edge and a trailing edge, said component being formed in order to reduce the amplitude of sound produced at frequency $f_{peak}$ when air flows in a flow direction from the leading edge of the aerofoil over the trailing edge of the component at freestream $U_\infty$, the method including the steps of:

(a) selecting a frequency $f_{peak}$ of sound that is to be reduced;
(b) selecting a freestream velocity $U_\infty$ of air;
(c) providing a component having a joining edge for joining to a trailing edge of an aerofoil and a trailing edge opposite said joining edge;
(d) forming the trailing edge of the component into a plurality of peaks separated by troughs, with each peak being connected to each trough on either side of the peak by a wall which is substantially perpendicular to the trailing edge, wherein the peaks each have a width (a) which is substantially parallel to the trailing edge and the troughs each have a width (W) which is substantially parallel to the trailing edge, said width also being the gap between adjacent peaks wherein the peaks lie substantially on a first axis and the troughs lie substantially on a second axis and wherein the shortest distance from the first axis to the second axis is defined as H,
(e) and wherein the component is formed according to the formula $$H = \frac{\hat{c} \cdot U_\infty}{2 f_{peak}},$$

where $\hat{c}$ is from 0.4 to 0.8.

In one embodiment, the ratio of the gap between adjacent peaks (W) and the spanwise correlation length scale of the turbulent eddies ($L_\gamma$) is governed by the expression $0.2 \leq W/L_\gamma \leq 0.5$.

A method for reducing the amplitude of sound produced at frequency $f_{peak}$ when air flows in a flow direction from the leading edge of an aerofoil over the trailing edge of an aerofoil at freestream velocity $U_\infty$ includes the steps of:

(a) forming an add-on component for an aerofoil according to a method as defined above and
(b) attaching said component to said aerofoil.

The method may additionally include the steps of forming a plurality of components and attaching said plurality of components to said aerofoil. For example, three components may be formed and attached to said aerofoil, the first component proximate the tip of the aerofoil, the second component proximate the middle of the aerofoil and the third component proximate the other end of the aerofoil to the tip.

In one embodiment the components may be identical. However, in an alternative embodiment said components have different values of H.

In a further aspect of the invention, there is provided a method for forming an add-on component for an aerofoil having a leading edge and a trailing edge, said component being formed in order to reduce the amplitude of sound produced at frequency $f_{peak}$ when air flows in a flow direction from the leading edge of the aerofoil over the trailing edge of the component at flow velocity U, the method including the steps of:

(a) selecting a frequency $f_{peak}$ of sound that is to be reduced;
(b) selecting a flow velocity U of air;
(c) providing a component having a joining edge for joining to a trailing edge of an aerofoil and a trailing edge opposite said joining edge;
(d) forming the trailing edge of the component into a plurality of pairs of peaks, each of said pairs having a first trough, a first peak, a second trough, a second peak, which is a greater distance from the joining edge than the first peak, and a third trough, wherein the first trough is on one side of the first peak, the second trough is between the first and second peak, and the third trough is on the other side of the second peak to the second trough;
(e) wherein the first and third troughs of each pair of peaks lie substantially on a first axis, the second troughs of each pair of peaks lie substantially on a second axis, and the second peaks of each pair of peaks lie on a third axis;
(f) and wherein the component is formed according to the formula:

$h' = U\kappa/4f_{peak}$ where $$\kappa = \left(\frac{h''}{h'}\right)^{0.4}$$

where h' is the shortest distance between the first axis and the second axis, h" is the shortest distance between the $2^{nd}$ and $3^{rd}$ axis, $f_{peak}$ is the frequency of sound to be reduced and U is the flow velocity in the flow direction of air flowing over the trailing edge of the component.

In yet a further aspect of the invention there is provided a method for reducing the amplitude of sound produced at frequency $f_{peak}$ when air flows in a flow direction from the leading edge of an aerofoil over the trailing edge of an aerofoil at flow velocity U, the method including the steps of providing at least one component which has been formed according to a method as defined above and attaching said component to said aerofoil.

In yet a further aspect of the invention there is provided add-on component for an aerofoil having a leading edge and a trailing edge, said component being formed in order to reduce the amplitude of sound produced at frequency $f_{peak}$ when air flows in a flow direction from the leading edge of the aerofoil over the trailing edge of the component at flow velocity U, the component including a joining edge for joining to a trailing edge of an aerofoil, a trailing edge opposite said joining edge, and a surface between the joining edge and the trailing edge, wherein the trailing edge of the component is formed into a plurality of pairs of peaks, each of said pairs having a first trough, a first peak, a second trough, a second peak, which is a greater distance from the joining edge than the first peak, and a third trough, wherein the first trough is on one side of the first peak, the second trough is between the first and second peak, and the third trough is on the other side of the second peak to the second trough, wherein the first and third troughs of each pair of peaks lie substantially on a first axis, the second troughs of each pair of peaks lie substantially on a second axis, and the second peaks of each pair of peaks lie on a third axis, where h' is the shortest distance between the first axis and the second axis, h" is the shortest distance between the $2^{nd}$ and $3^{rd}$ axis, and wherein the maximum thickness of the component in a direction perpendicular to said surface is from 0.5 mm to 10 mm.

DETAILED DESCRIPTION OF ILLUSTRATIVE EMBODIMENT(S)

An aerofoil add-on component for carrying out the method in accordance with the invention is referred to herein as Double-Rooted Trailing Edge Serration (abbreviated to "DRooTES"), where for the first time, not only the level of trailing edge noise reduction can be improved, but also fine-tuning of the frequency of interest for the self-noise reduction becomes a possibility. This nomenclature has been adopted by analogy with a standard sawtooth serration, which is referred to herein as "SRooTES" (Single Rooted Trailing Edge Serration).

Nomenclature
- f=frequency, Hz
- H=amplitude, m
- λ=wavelength, m
- h'=root-root longitudinal displacement, mm
- h"=root-tip longitudinal displacement, mm
- ϕ=angle of the secondary serration tip, degrees
- $\lambda_0$=root-mid root lateral displacement, mm
- h=half of amplitude, m
- $c_0$=chord length, m
- W=slit width at root, mm
- α=slit width at tip, mm
- AoA, θ=Angle of Attack
- Θ Polar Angle, degrees
- $U_\infty$ Freestream Velocity, m/s
- x=Position on aerofoil
- n=convection velocity factor
- $\overline{C}$=factor for the propagation of the pressure driven turbulent eddies
- PWL=Sound Power Level, dB
- ΔPWL=Difference in Sound Power Level, dB
- OAPWL=Overall Sound Power Level, dB
- $L_y$=spanwise correlation length scale of the turbulent eddies Scientific Theory This application focuses on the characteristics and mechanisms of acoustic interferences on turbulent boundary layer trailing edge noise by DRooTES and slit trailing edges. The fundamental theory that underpins this work is based on interference in wave theory. There are two forms of interference: constructive and destructive. In theory, a perfect destructive interference occurs when acoustic radiation from two sources, $S_1$ and $S_2$ as shown in FIG. 1B, are 180° (π) out-of-phase. The relevant phase difference (or phase angle) can be expressed as n π, where n=1, 3, 5, and so on. This results in the cancellation of the acoustic radiation. In contrast, a perfect constructive interference occurs when acoustic radiation is in-phase between the two sources (i.e. when n=2, 4, 6, and so on), which results in amplification of the acoustic radiation to the far field. As a generic term, the following equation is applied to determine the phase angle, $\hat{\omega}$, defined as:

$$\hat{\omega} = \frac{\omega \cdot l}{U_\infty}, \text{ where } \omega = 2\pi f \qquad \text{Eqn. 1}$$

where ω is oscillation frequency, f is the frequency, l is the longitudinal displacement between the two sources and $U_\infty$ is the freestream velocity.

Figure 1A:
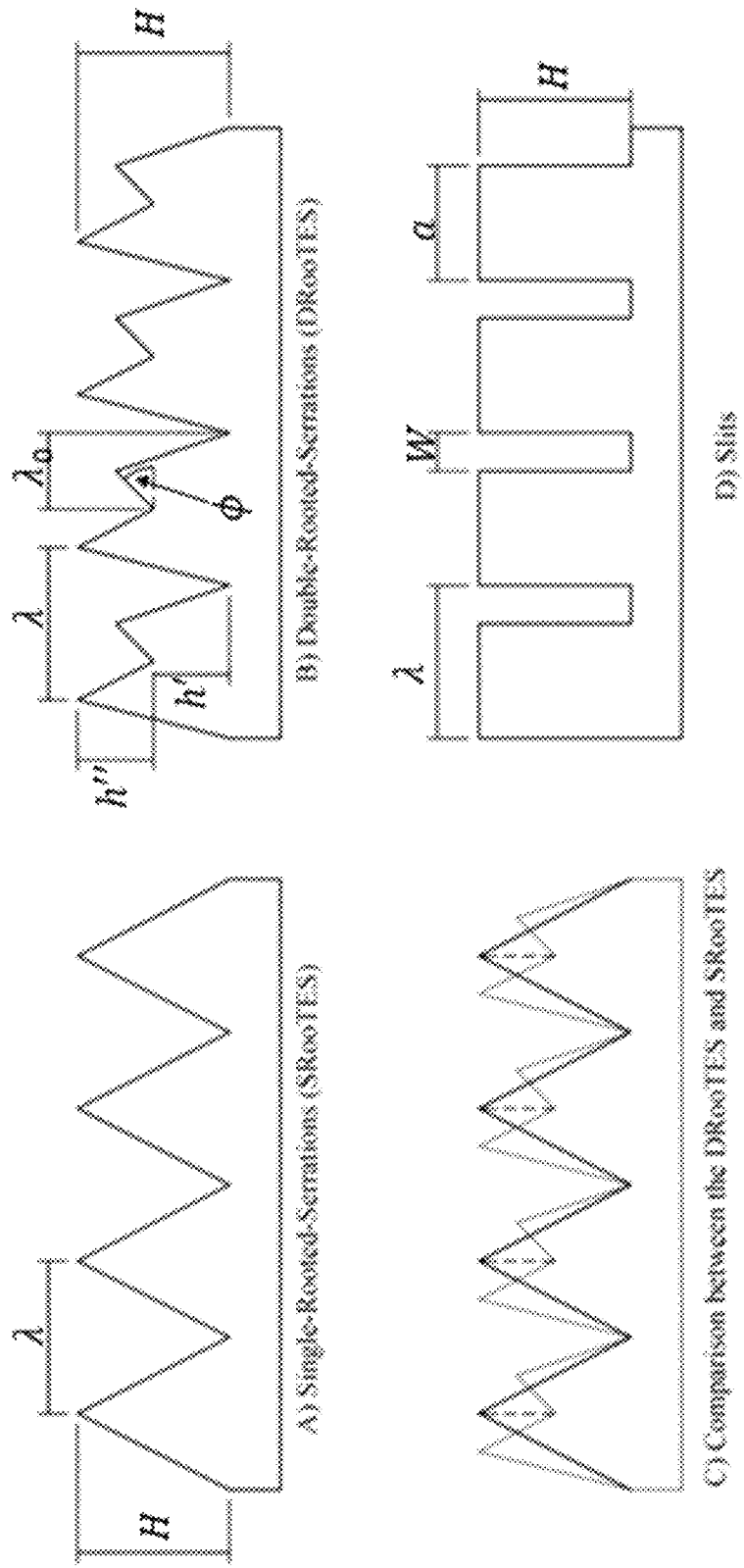
FIG. 1A is a schematic drawing showing the geometric parameters of the SRooTES, DRooTES and Slit trailing edge add-ons.
Figure 1B:
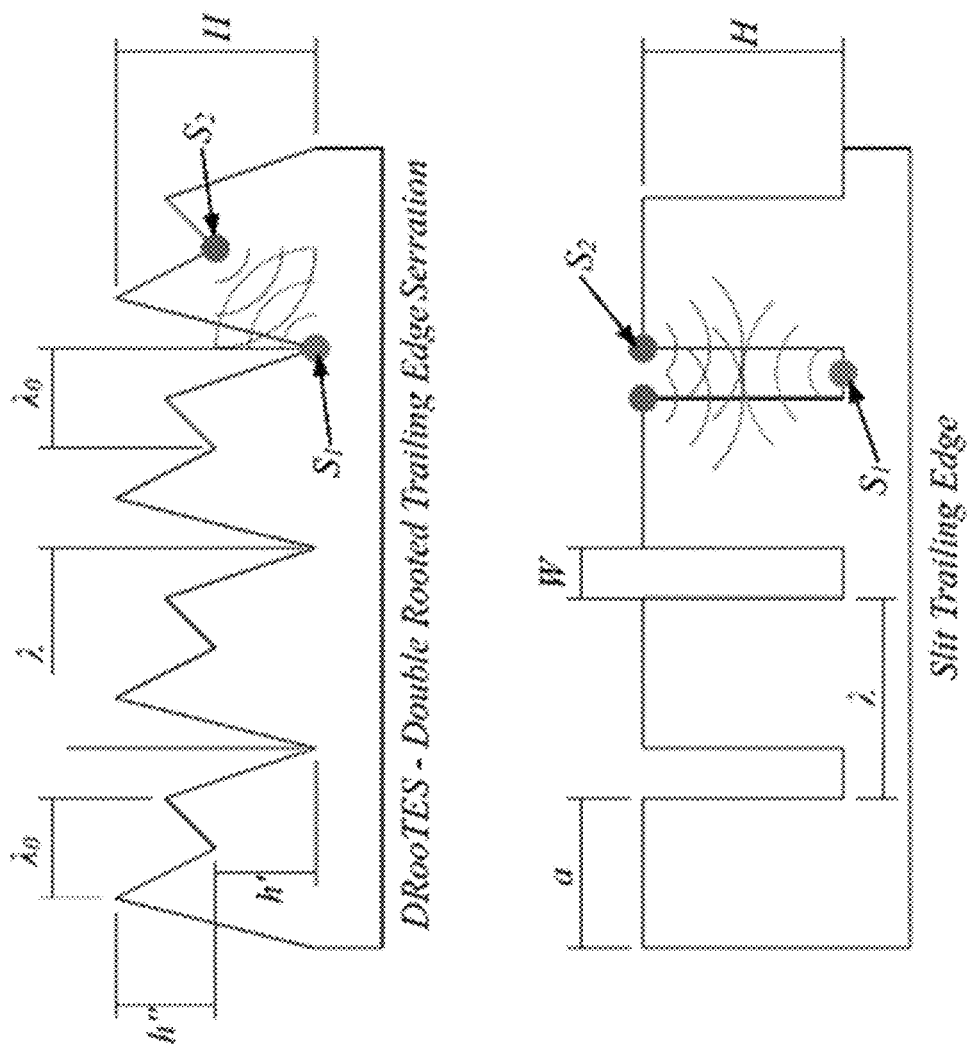
FIG. 1B is a schematic drawing of DRooTES and slit trailing edge add-ons for carrying out the method according to the invention.

Therefore, applying an "out-of-phase" angle (destructive interference) to Eqn. 1, based on the distance between S1 and S2 (scatter sources) defined as h' for the DRooTES, and H for the Slit trailing edge in FIG. 1A, the following equations are derived:

$$\frac{2\pi f \cdot l}{U_\infty} = n\pi \qquad \text{Eqn. 2}$$

-continued
$$St = \frac{f \cdot l}{U_\infty} = \begin{cases} \frac{1}{2}n & \text{for destructive interference}, \quad n = 1, 3, 5, \ldots \\ \frac{1}{2}n & \text{for constructive interference}, \quad n = 2, 4, 6, \ldots \end{cases}$$

where St is known as the Strouhal number, which demonstrates the respective values of non-dimensional frequency at which destructive interference occurs at odd numbers, and for the constructive interference occurs at even numbers.

Details of the Trailing Edge Parameters

The acronyms used herein as follows: Slits, and Double-Rooted Serrations (DRooTES).

Experimental Set-Up

A NACA65-(12)10 cambered aerofoil has a chord-length of $c_0$=0.145 m to $c_0$=0.170 m for serrated trailing edge cases, except for the Baseline (B), (un-serrated) chord length of $c_0$=0.1425 m to $c_0$=0.155 m, and a spanwise length of 0.45 m. To ensure similar wetted surface areas, different chord lengths were used for the baseline and serrated cases. The chord-lengths of the un-serrated trailing edge cases (Baseline) were half of the chord lengths for the serrated trailing edges in Slits and Double-Rooted Serrations (DRooTES). Note that, basically, the SRooTES represents a simple sawtooth trailing edge. The aerofoil was constructed in two main parts: the main aerofoil body and the detachable flat plate trailing edge. The main aerofoil was manufactured from aluminium alloy with surface pressure taps across the upper and lower surfaces, and a 0.8 mm slot along the trailing edge. A detachable, flat plate of 0.8 mm thickness was laser cut to form various trailing edge shapes.

The wind tunnel facilities and instrumentation setup for the far-field noise measurement were performed in the aero-acoustics facility at Brunel University London, which consisted of an open jet wind tunnel within an anechoic chamber of 4 m×5 m×3.4 m. The open jet nozzle dimension was 0.3 m×0.1 m (width×height). The aerofoil was attached to the side plates flush to the nozzle lips. The open jet wind tunnel had an operation capacity of up to U=80 m/s, with typical low turbulence flow between 0.1% and 0.2%. The background noise (without aerofoil, but with side plates) was largely contributed by the open jet noise, which was very low in comparison to the aerofoil self-noise level produced at the identical flow speed. All far-field noise measurements were performed at the geometric angle of attack (AoA) θ=0°.

Far-Field Array Noise Measurements

Figure 1C:
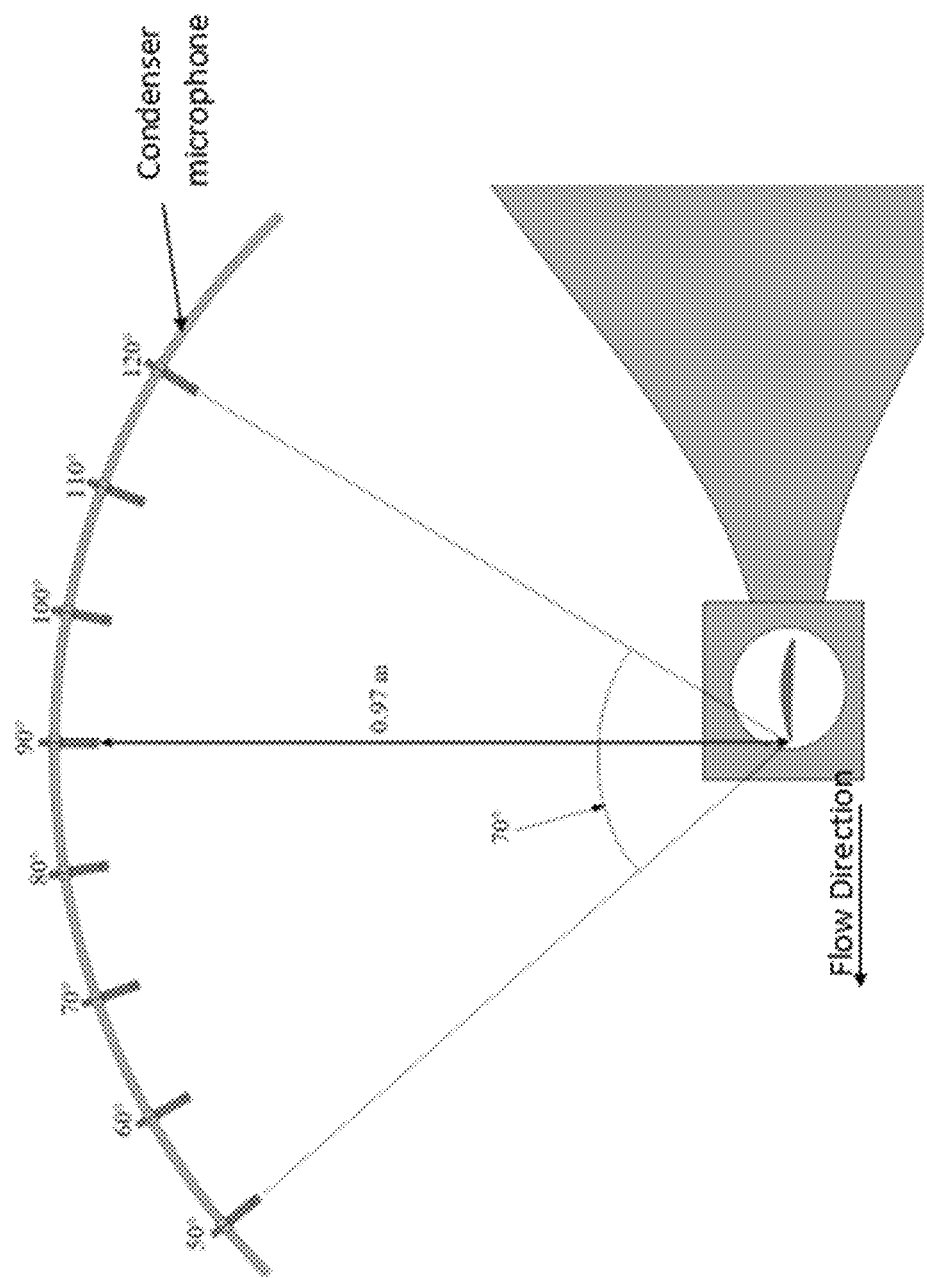
FIG. 1C is a schematic drawing of the experimental set-up of the of the far-field noise measurement described herein.

The far-field array noise measurements were performed with eight G.R.A.S. half-inch condenser microphones (46 AE) mounted at polar angles from Θ=50° to Θ=120° intervals of Θ=10°. The Θ=90° microphone was positioned at the mid-span of the aerofoil and at 0.97 m above the trailing edge. FIG. 1C illustrates the experimental setup of the far-field array. A gain of ±20 dB was applied to each microphone signal through the G.R.A.S. 12AX 4-Channel CCP amplifier. The data were acquired using a 16-bit analogue-digital card manufactured by National Instruments. The sampling frequency was 40 kHz with a sampling time of 20 seconds. The data were windowed and the Power Spectral Density (PSD) of 1 Hz bandwidth was computed from a 1024 points FFT and a 50% overlap time. The noise was calculated to obtain the Sound Power Level (PWL) assuming a spherical spreading of the sound waves from the trailing edge. Noise measurements were taken at various freestream velocities from U=20 m/s to U=60 m/s, at U=10 m/s intervals. A illustrates the geometric parameters of the trailing edge flat plate cases. For the DRooTES, these are defined as the serration amplitude (H), serration wavelength (λ), root1-root2 longitudinal displacement (h'), root2-tip2 longitudinal displacement (h"), angle of the serration tip (φ) and lateral-displacement serration roots ($\lambda_0$). Unless otherwise stated, the root1-root2 longitudinal displacement (h') and root1-root2 lateral displacement ($\lambda_0$) are normally half the amplitude (H) and wavelength (λ) respectively. For the Slit, the geometrical parameters are the slit amplitude (also defined by H), slit wavelength (also defined by λ), width of slip tip (α) and width of slit gap (W).

Experimental Set-Up

A NACA65-(12)10 cambered aerofoil has a chord-length of $c_0$=0.145 m to $c_0$=0.170 m for serrated trailing edge cases, except for the Baseline (B), (un-serrated) chord length of $c_0$=0.1425 m to $c_0$=0.155 m, and a spanwise length of 0.45 m. To ensure similar wetted surface areas, different chord lengths were used for the baseline and serrated cases. The chord-lengths of the un-serrated trailing edge cases (Baseline) were half of the chord lengths for the serrated trailing edges in Slits and Double-Rooted Serrations (DRooTES). Note that, basically, the SRooTES represents a simple sawtooth trailing edge. The aerofoil was constructed in two main parts: the main aerofoil body and the detachable flat plate trailing edge. The main aerofoil was manufactured from aluminium alloy with surface pressure taps across the upper and lower surfaces, and a 0.8 mm slot along the trailing edge. A detachable, flat plate of 0.8 mm thickness was laser cut to form various trailing edge shapes.

FIG. 1A illustrates the geometric parameters of the trailing edge flat plate cases. These are defined as the serration amplitude (H), serration wavelength (λ), root1-root2 longitudinal displacement (h'), root2-tip2 longitudinal displacement (h"), angle of the serration tip (φ) and lateral-displacement serration roots ($\lambda_0$). Unless otherwise stated, the root1-root2 longitudinal displacement (h') and root1-root2 lateral displacement ($\lambda_0$) are half the amplitude (H) and wavelength (λ) respectively. For the Slit, the geometrical parameters are the slit amplitude (also defined by H), slit wavelength (also defined by λ), width of slip tip (α) and width of slit gap (W). The present study investigated four cases: Baseline, SRooTES, DRooTES and Slit. FIG. 1B compares more closely the DRooTES and Slit geometries and will be referred to below.

A 0.8 mm slot along the rear end of the main aerofoil body allows for insertion of 0.8 mm thickness flat plate trailing edges. The ranges of serration amplitude (H) and wavelength (λ) of the Slit, SRooTES and DRooTES were 5 mm≤H≤30 mm intervals of 5 mm, and 3 mm≤λ≤35 mm respectively. The root1-root2 lateral displacement and angle of the serration tip of the DRooTES were 1.5 mm≤$\lambda_0$≤4.5 mm interval of 1.5 mm and 0°≤φ≤84.3°. The Baseline trailing edge was half the amplitude of the serrated case, to ensure similar wetted surface area to both SRooTES and DRooTES. For the ease of comparison between SRooTES and DRooTES to the slit trailing edge the Baseline trailing edge would also be assumed to be half the amplitude. A coarse sandpaper was permanently applied to the upper and lower surfaces at 30 mm from the aerofoil leading edge to ensure the boundary layers were fully tripped to turbulent. The sandpaper strip had a width of 10 mm and a thickness of 0.95 mm.

Wind Tunnel Facilities and Instrumentation

The wind tunnel facilities and instrumentation setup for the far-field noise measurement were performed in the aero-acoustics facility at Brunel University London, which consisted of an open jet wind tunnel within an anechoic chamber of 4 m×5 m×3.4 m. The open jet nozzle dimension was 0.3 m×0.1 m (width×height). The aerofoil was attached to the side plates flush to the nozzle lips. The open jet wind tunnel had an operation capacity of up to U=80 m/s, with typical low turbulence flow between 0.1% and 0.2%. The background noise (without aerofoil, but with side plates) was largely contributed by the open jet noise, which was very low in comparison to the aerofoil self-noise level produced at the identical flow speed. All far-field noise measurements were performed at the geometric angle of attack (AoA) 0=0°.

Far-Field Array Noise Measurements

The far-field array noise measurements were performed with eight G.R.A.S. half-inch condenser microphones (46 AE) mounted at polar angles from Θ=50° to Θ=120° intervals of Θ=10°. The Θ=90° microphone was positioned at the mid-span of the aerofoil and at 0.97 m above the trailing edge. FIG. 1C illustrates the experimental setup of the far-field array. A gain of ±20 dB was applied to each microphone signal through the G.R.A.S. 12AX 4-Channel CCP amplifier. The data were acquired using a 16-bit analogue-digital card manufactured by National Instruments. The sampling frequency was 40 kHz with a sampling time of 20 seconds. The data were windowed and the Power Spectral Density (PSD) of 1 Hz bandwidth was computed from a 1024 points FFT and a 50% overlap time. The noise was calculated to obtain the Sound Power Level (PWL) assuming a spherical spreading of the sound waves from the trailing edge. Noise measurements were taken at various freestream velocities from U=20 m/s to U=60 m/s, at U=10 m/s intervals.

Results and Discussion

The results are presented in this section. The section covers the noise measurements obtained by the DRooTES and Slit trailing edges at $U_\infty$ between 20 m/s and 60 m/s, with an interval of 10 m/s, at angle of attack θ=0°.

So far, when describing the flow velocity, the freestream value $U_\infty$ is only refer to in the generic equations (Eqn. 1 and Eqn. 2). However, when describing the acoustical destructive mechanism for the DRooTES and Slits, the main parameter is the convection speed of the turbulent eddies $U_c$, not the freestream velocity $U_\infty$. It should be noted that the convection speed of the turbulent eddies would also be affected by pressure-driven secondary flow structure along the edge. It has been determined that the net convection speed of the turbulent eddies $u_c$ is between 40% and 80% of the freestream velocity, i.e. between $$\frac{U_C}{U_\infty} = 0.4 \text{ and } \frac{U_C}{U_\infty} = 0.8.$$

Therefore, for the present DRooTES and Slit trailing edge, the generic expression in Eqn. 2 can be modified as:

$$St = \frac{f \cdot l}{u_c}, u_c = \hat{c} \cdot U_\infty \qquad \text{Eqn. 3}$$

where ĉ is the convection velocity factor, whose values lie between 0.4 and 0.8. As per the definition in Eqn. 3, the destructive interference mechanisms should occur at St=0.5, 1.5 and so on, between the roots of the DRooTES, and roots and tips of the slit trailing edge.

Slit Trailing Edge

Slit Amplitude (H)

Figure 2:
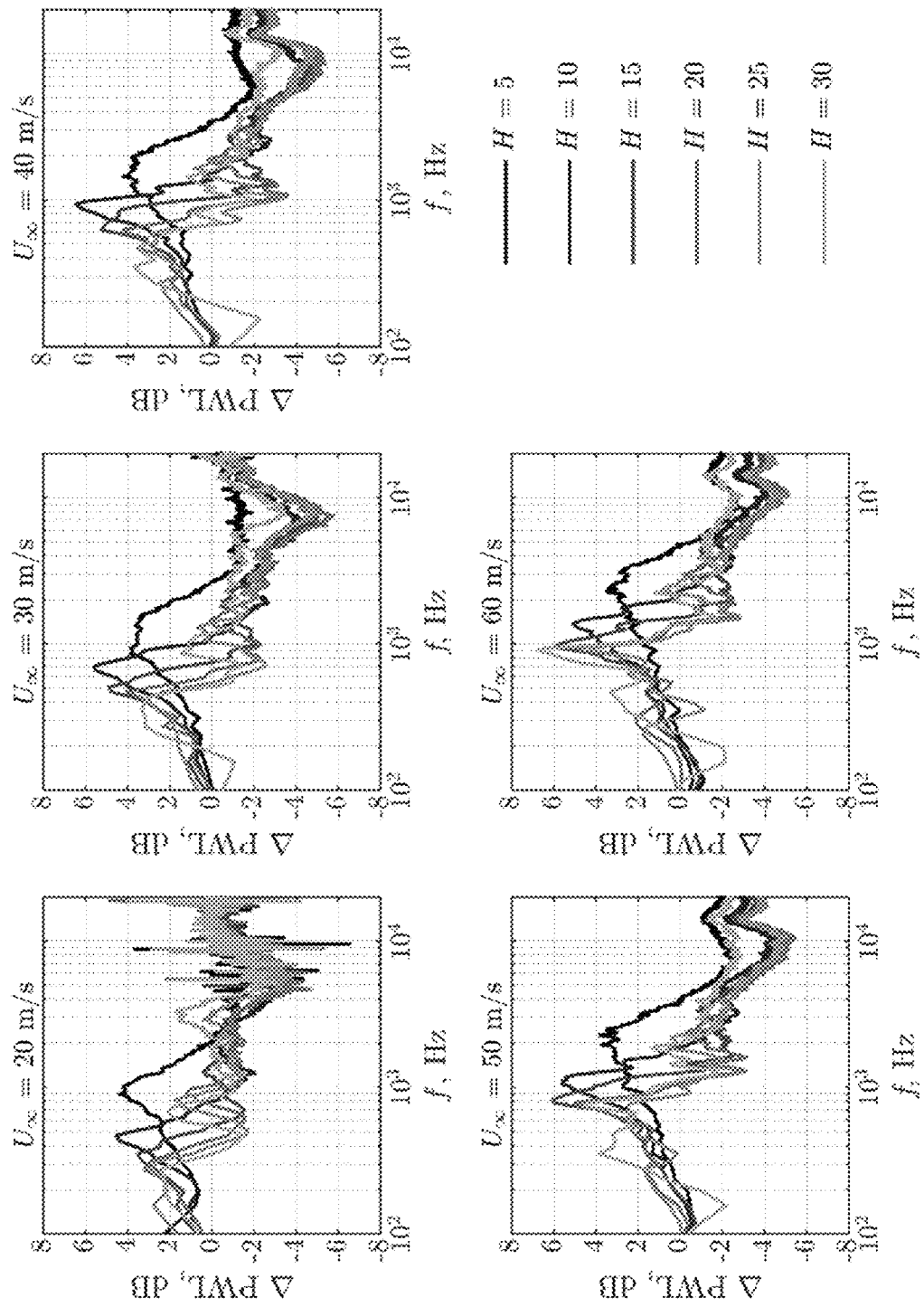
FIG. 2 depicts graphs comparing the performance of slit trailing edges at various slit amplitudes, H, where λ=3 mm, for ΔPWL, dB, at 20 m/s≤$Q_∞$≤60 m/s.

FIG. 2 illustrates a comparison of the sensitivity of slit trailing edges at various H at different freestream velocities, $U_\infty \Delta$PWL is defined as the difference between sound power levels, as a function of frequency, between the Baseline and Slit trailing edges: $\Delta$PWL=PWL$_B$(f)−PWL$_{Slit}$(f). Note that the positive value of $\Delta$PWL represents reduction in noise level, and the opposite is true for a negative value of $\Delta$PWL to be treated as noise level increases. The results clearly show that slit trailing edge are the most effective in producing noise reduction up to 7 dB across the low to mid-frequency range. The slit trailing edge can also result in significant degradation in performance, compared to the Baseline trailing edge, at high frequencies up to 5 dB. In addition, distinctive peaks of noise reduction $\Delta$PWL achieved by individual slit trailing edges appears not to follow a trend of slit amplitude H across various $U_\infty$. The individual slit trailing edges observed that the maximum $\Delta$PWL exhibited a relationship f to $U_\infty$ and to H as follows:

$$f \propto U_\infty \qquad \qquad 1.$$

1. $f \propto U_\infty$

2. $f \propto \dfrac{1}{H}$

Thus, the acoustic frequency where the maximum noise reduction occurs has a relationship to freestream velocity and the longitudinal displacement between either end of the slit (root and tip), H.

Non-Dimensional Frequency—Slit Amplitude, H

Figure 3:
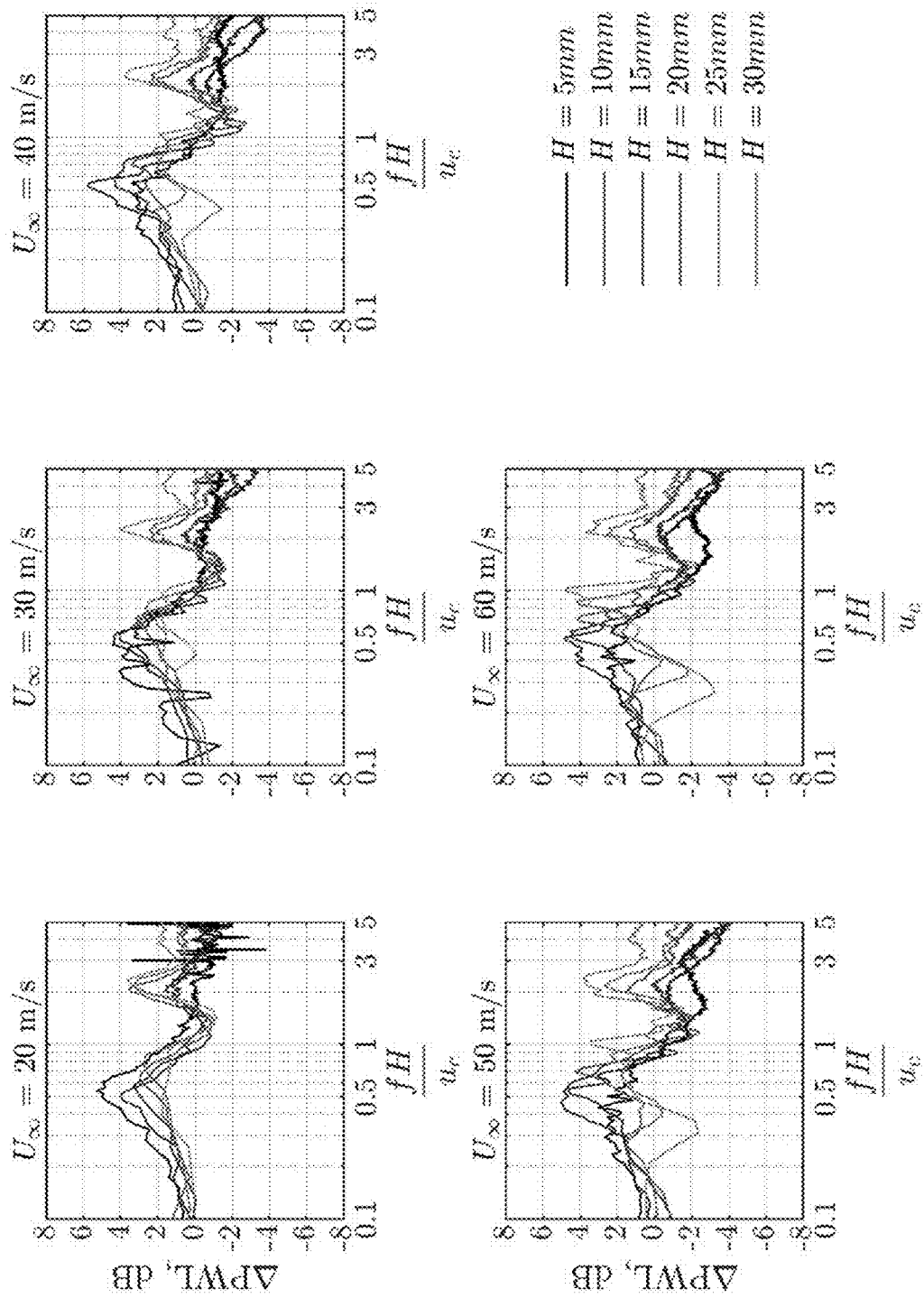
FIG. 3 depicts graphs comparing non-dimensional frequency at various slit amplitudes, H; where λ is kept at 3 mm, W is kept at 0.3 mm and ĉ=0.45; at 20 m/s≤$U_∞$≤60 m/s.
Figure 4:
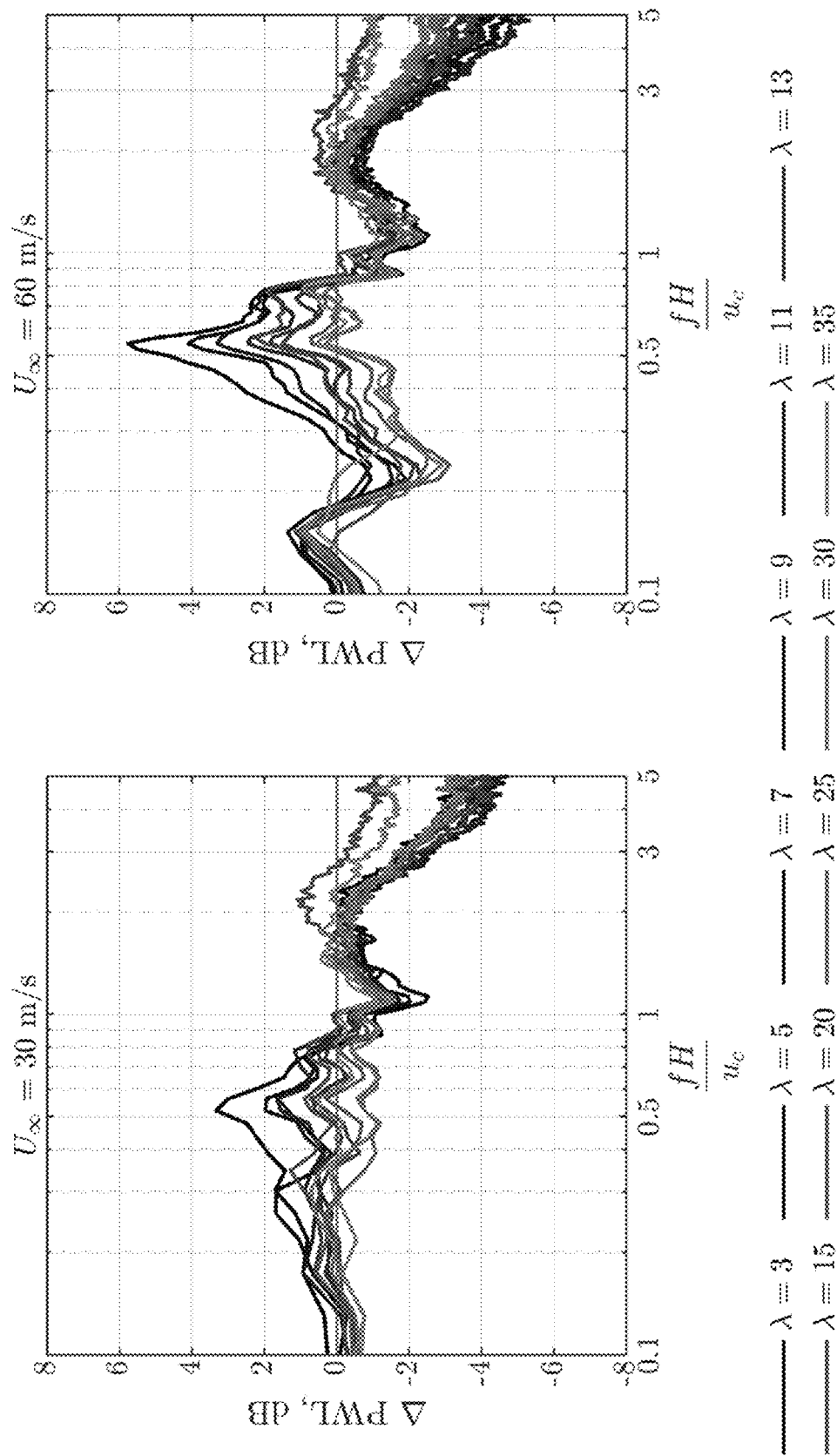
FIG. 4 depicts graphs comparing the performance of slit trailing edges at various slit wavelength, 2 (mm), and width of slit root, W kept at 0.3 mm. ĉ=0.45, for ΔPWL, dB, at $U_∞$=30 m/s and $U_∞$=60 m/s.

FIG. 3 illustrates whether application of non-dimensional frequency against the broadband noise reduction of the slit trailing edge, at various slit amplitude (H), can be generalised. In theory, perfect destructive interference occurs when the acoustic radiations are at 180° out-of-phase between two sources, resulting in cancellation of the acoustic radiation. This is illustrated in FIG. 1B, which shows the initial hypothesis of the destructive interference between two sources at the root and tip of the slit trailing edge. This means that the non-dimensional frequency (f·H/$u_c$, where l=H for the slit trailing edge), defined in Eqn. 3, should be equal to 0.5. FIG. 4 shows that the peak $\Delta$PWL indeed takes place at around the St≈0.5 for different slit amplitudes (except for the U=60 m/s, where a slight fluctuation of Strouhal number is evident). These results obtained experimentally confirm that the destructive interference mechanism pertaining to the 180° out of phase cancellation between the two sources (root and tip) is responsible for the maximum noise reduction.

Furthermore, FIG. 3 clearly demonstrates that all the peaks $\Delta$PWL pertaining to the slit configurations are followed by a significant dip of $\Delta$PWL (noise increase) at St≈1, which is twice the value for the Strouhal number for maximum noise reduction discussed in the previous paragraph. This is another evidence of the acoustical interference mechanisms being present between the sources of the slit trailing edges. In summary, the destructive interference mechanisms (noise reduction) should occur at St=0.5, 1.5, and so on, between the roots and tips of the slit trailing edge. This is consistent with the experimentally observed destructive interference at St≈0.5 and St≈1.5. On the other hand, a constructive interference (noise increase) occurs at St≈1.

Non-Dimensional Frequency—Wavelength ($\lambda$) with Constant Width of Slit Root (W)

FIG. 4 shows a comparison of the sensitivity of non-dimensional frequency at various $\lambda$ of the slit trailing edges, where the slit width, W, was kept constant at 0.3 mm. The results shown in FIG. 4 are observed at all freestream velocities. The results clearly demonstrate that $\lambda$ has no effect on the non-dimensional frequency with good comparison of the collapse $\Delta$PWL peaks. Furthermore, the $\Delta$PWL peak corresponds to the destructive interference at St≈0.5 and St≈1.5, and constructive interference at St=1 for all cases. The effects of acoustic interference mechanism were still observable at the largest $\lambda$ slit trailing edge cases, however, the effects of the mechanism were greatly weakened in comparison to the smallest $\lambda$.

Width of Slit Root (W) with a Constant Wavelength ($\lambda$)

Figure 5:
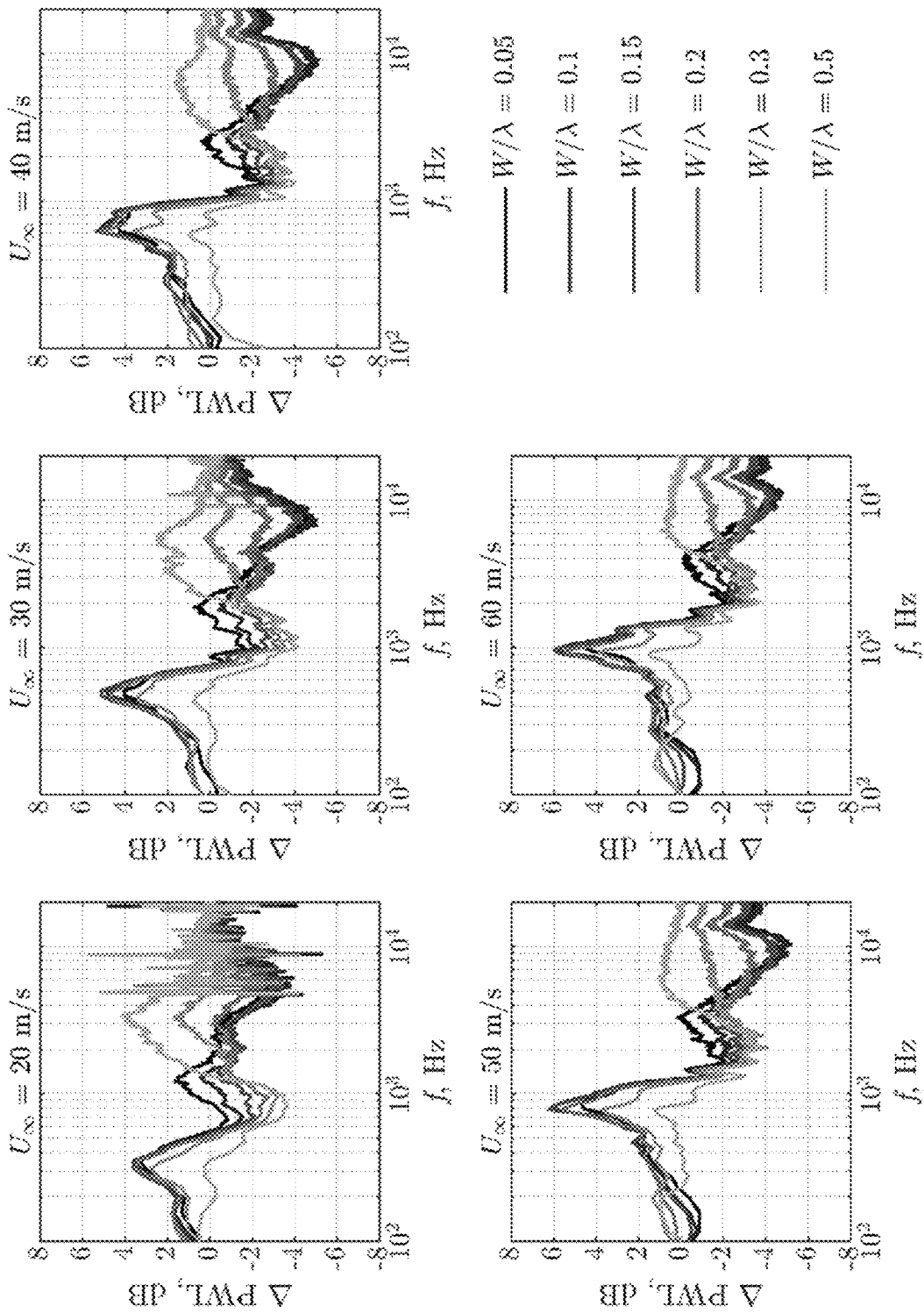
FIG. 5 depicts graphs comparing the performance of between the baseline and slit (different W/λ, but with the same λ) trailing edges for ΔPWL, dB; where H=15 mm; λ=3 mm; at 20≤$U_∞$≤60 m/s.

FIG. 5 presents a comparison of the broadband noise radiation for slit trailing edges at different aspect ratios of W/$\lambda$, where $\lambda$ was kept constant at 3 mm. The results clearly demonstrate that as W increases, significant degradation of the noise performance (negative $\Delta$PWL) occurs at low-to-mid frequencies across all freestream velocities. When W increases, the slit geometry becomes less compact, and eventually exceeds the spanwise integral length scale of the turbulent eddies. In this case, the slit at the root region slowly reverts to a straight trailing edge noise mechanism, which in turn diminishes the noise reduction capability.

In these experiments, the best performer is W/$\lambda$=0.15 with reduction up to 6 dB, whereas the worst performer is with the largest W/$\lambda$=0.5. At mid-to-high frequencies, 600 Hz<f<20 kHz, it can be observed that the largest W/$\lambda$(=0.5) is the only configuration that does not result in noise increase. It can even achieve a slight broadband noise reduction up to 4 dB at low velocity. All the smaller W/$\lambda$ configurations, on the other hand, only produce noise increase. Whereas, the slit trailing edges with smaller W/$\lambda$ configuration result in a larger noise increase. Based on the results presented thus far, the following statements can be summarised:

1) Small W/$\lambda$ configuration is desirable for broadband noise reduction at low-to-mid frequency. This is to avoid the slit width becoming comparable with the spanwise integral length scale of the turbulent eddies, which will weaken the destructive interference mechanism.

2) Large W/$\lambda$ configuration is desirable to avoid noise increase at high frequency. This is to reduce the tendency of cross-flow across the slits and minimise flow leakage.

The noise reduction is subjected to the boundary condition of the ratio between the slit gap (W), and the incoming spanwise correlation length scale of the turbulent eddies ($L_y$) near the trailing edge. It is found from the experiments that the optimal condition for noise reduction at $f_{peak}$ to occur is approximately when $0.2 \leq W/L_y \leq 0.5$. The lower and upper limits of W/$L_y$ may fluctuate depending on the flow condition (such as Reynolds numbers, Mach numbers, etc).

DRooTES

Comparison of the Noise Results by DRooTES with Different Root-to-Root Amplitude (h')

Figure 6:
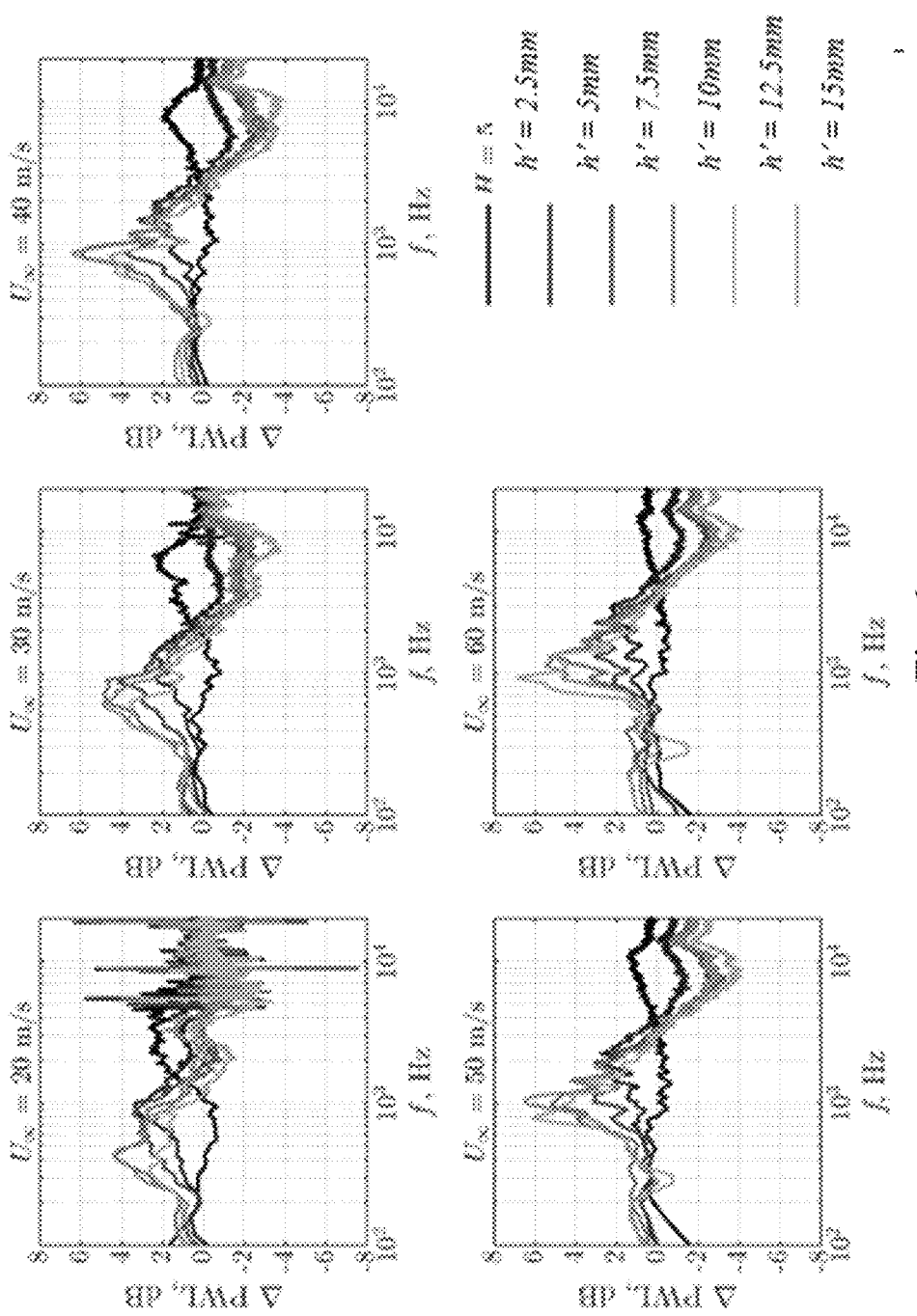
FIG. 6 depicts graphs showing the comparison between the baseline and DRooTES (with different h') trailing edges, ΔPWL (dB); where λ 3 mm; at 20≤$U_∞$≤60 m/s.

The next investigation is to examine a new geometry feature, additional root, also utilising acoustic interference. This new geometry is called the DRooTES. FIG. 6 presents a comparison of the broadband noise reduction (as well as noise increase) by the DRooTES against the baseline trailing edge at different root-to-root amplitude, h' (see FIG. 1B). The best performer amongst all the DRooTES cases is the largest amplitude h'=15 mm with noise reduction up to 7 dB at $U_\infty$=60 m/s. The smallest h'=2.5 mm exhibits noise reduction against the baseline trailing edge only at high frequency. The overall trend witnessed a degradation of the level of noise reduction with the decrease in amplitude of the DRooTES. At high frequencies, DRooTES exhibit an increase in noise, up to 2 dB, with the increase in amplitude.

Non-Dimensional Frequency—when the Root1-to-Root2 (h')=Root2-to-Tip (h") for DRooTES Assuming that destructive interference between the two sources as per the FIG. 1B exists for the DRooTES, the distance between them (h') should be used for the Strouhal number St. For destructive interference of a DRooTES, the following condition must be fulfilled:

$$St = \frac{fh'}{u_c}\kappa = \frac{1}{2}n$$

where $\omega=2\pi f$. $u_c$ is the same definition used for the slit trailing edge earlier, which is the convection speed of the turbulent eddies after subjected to the interaction with the pressure-driven secondary flow. The empirical factor $$\kappa = \left(\frac{h''}{h'}\right)^{0.4},$$

accounts for the possible non-equal value between the h' and h" in the frequency scaling for the DRooTES.

Figure 7:
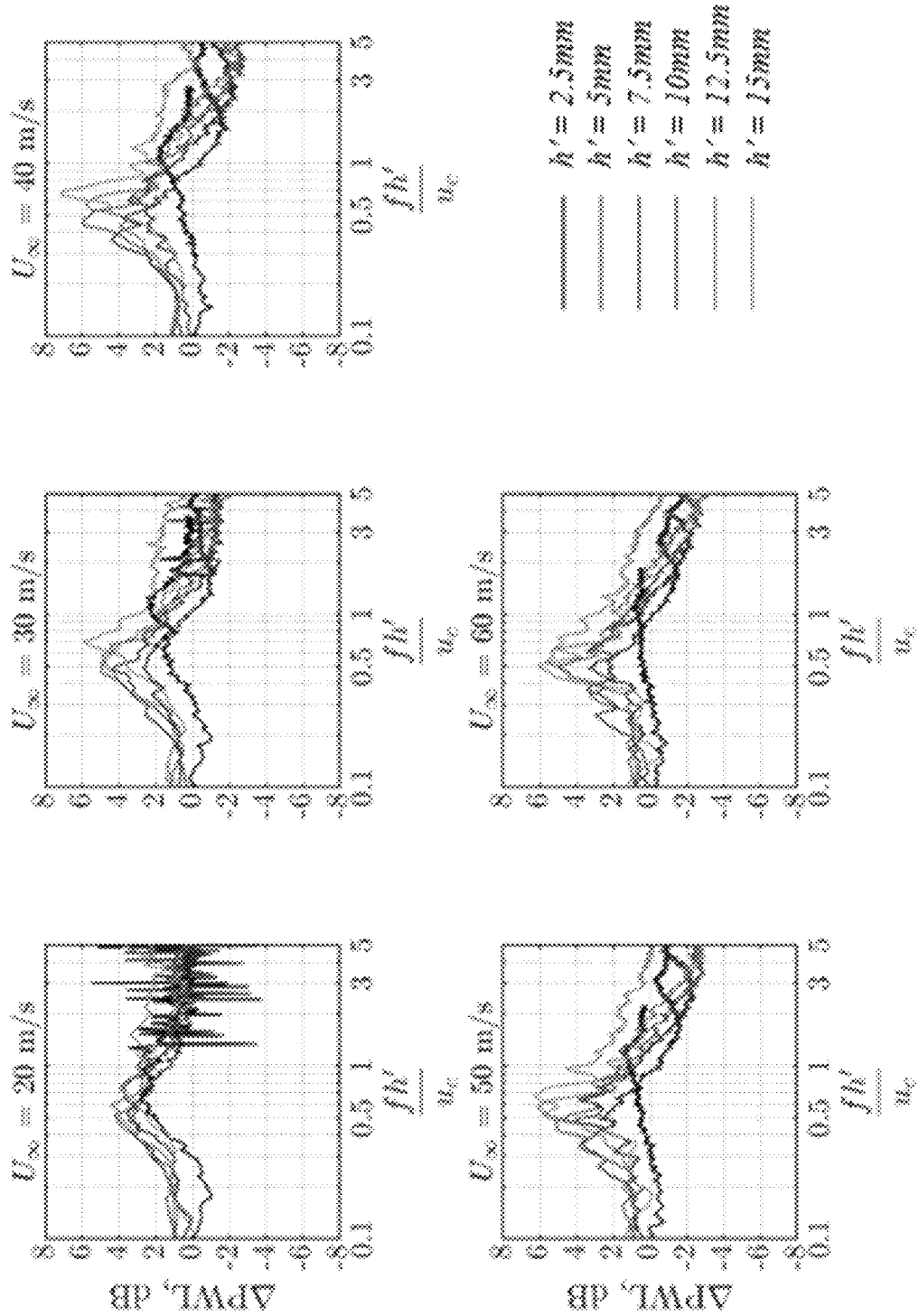
FIG. 7 depicts graphs showing the non-dimensional frequency of the DRooTES when h'=h", i.e. κ=1, at various root-to-root amplitude h', λ=6 mm and ĉ=0.45, at 20≤$U_∞$≤60 m/s.

FIG. 7 shows the spectra of ΔPWL with non-dimensional frequencies f·h'/$u_c$. Note that because h'=h"i, κ=1. It can be seen that the maximum noise reduction (maximum ΔPWL) occurs at St≈0.5, which is very close to the values observed for the slit trailing edge. This demonstrates the same acoustical destructive mechanism is also valid for the DRooTES.

Figure 8:
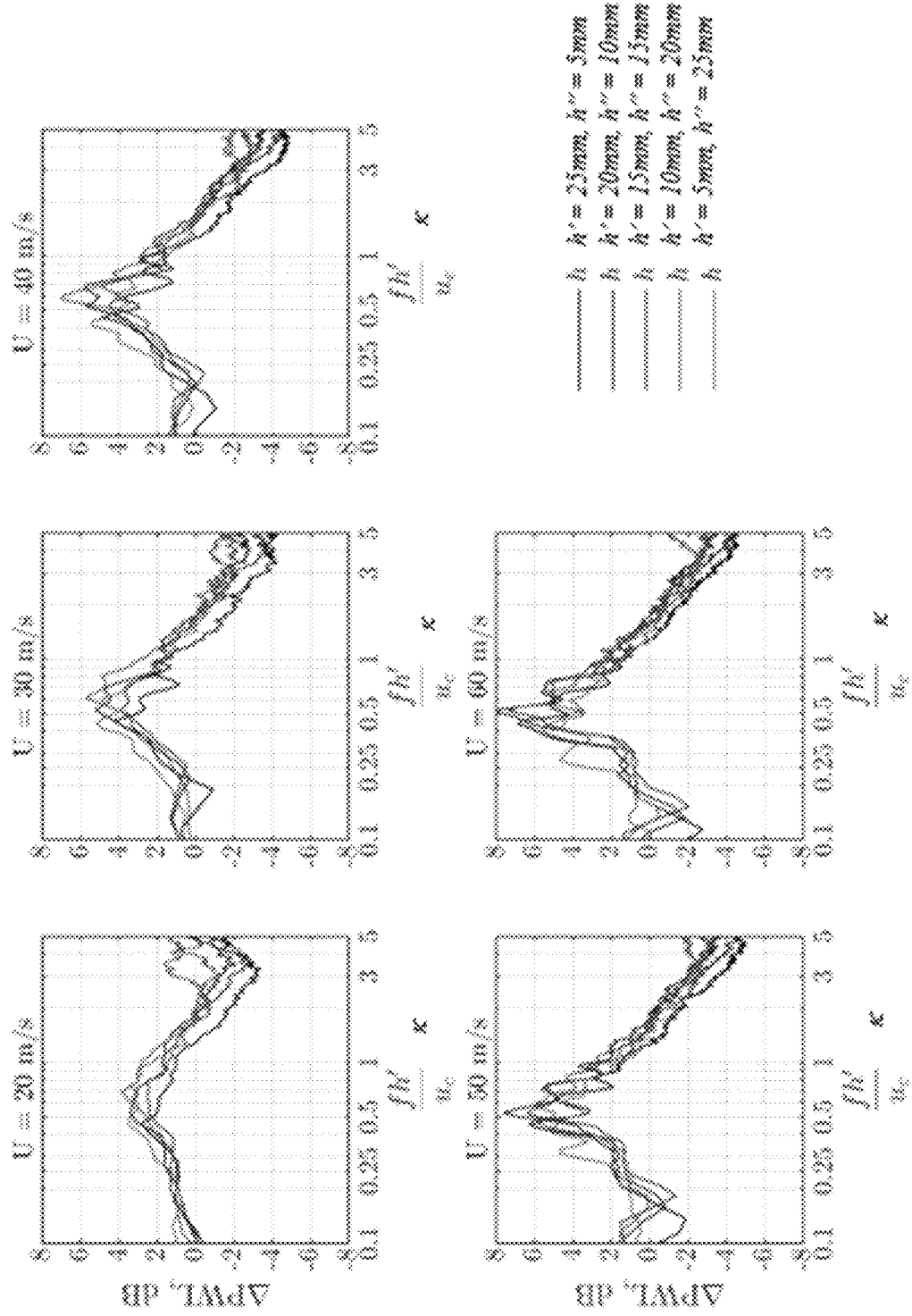
FIG. 8 depicts graphs showing the non-dimensional frequency of the DRooTES when h'≠h", i.e. κ≠1, at various amplitude H, λ=6 mm and ĉ=0.45, at 20≤$U_∞$≤60 m/s.

Non-Dimensional Frequency—when the Root1-to-Root2 (h')≠Root2-to-Tip h') for DRooTES, with Constant H=30 mm When h'≈h", then κ is no longer unity. Applying the factor of $$\kappa = \left(\frac{h''}{h'}\right)^{0.4}$$

into the frequency scaling, FIG. 8 shows the sensitivities of broadband noise radiation at non-dimensional frequency at various h', where h' is then adjusted accordingly to produce the overall H constant at 30 mm. The results demonstrate that the different curves collapse well. The increase of h' affects the maximum noise reduction peak. The best performer was h'=20 mm with 8 dB reduction in comparison to the h'=5 mm which achieved only 5 dB at same freestream velocity. However, the acoustic performance is depended on both the geometrical parameters and flow conditions.

SUMMARY

To determine the optimal geometrical dimension for the slits and DRooTES (H for the slit, and h' for the DRooTES), the following equations apply:

For slit, $$H = \frac{\hat{c} \cdot U_\infty}{2f_{peak}}, \text{ where } \hat{c} = 0.4 - 0.8 \quad \text{Eqn. 4}$$

For DRooTES, $$h' = \frac{\hat{c} \cdot U_\infty \cdot \kappa}{2f_{peak}}, \text{ where } \hat{c} = 0.4 - 0.8 \text{ and } \kappa = \left(\frac{h''}{h'}\right)^{0.4} \quad \text{Eqn. 5}$$

Overall, the factors that potentially affect the exact values of $\hat{c}$ and $f_{peak}$ (sources of uncertainty) are:
1) Turbulent eddies scatter into pressure waves in close proximity to the roots, not exactly at the root, which can affect the "true" longitudinal displacement between roots and tips of the slit.
2) Variation of the convection velocity factor ranges for the turbulent eddies
3) An additional factor affecting the convection speed of the turbulent eddies due to the presence of secondary flows (e.g. the cross-flow within the slit), defined as $\bar{c}$.

Comparison of the SRooTES, DRooTES and Slit Trailing Edges

Figure 9:
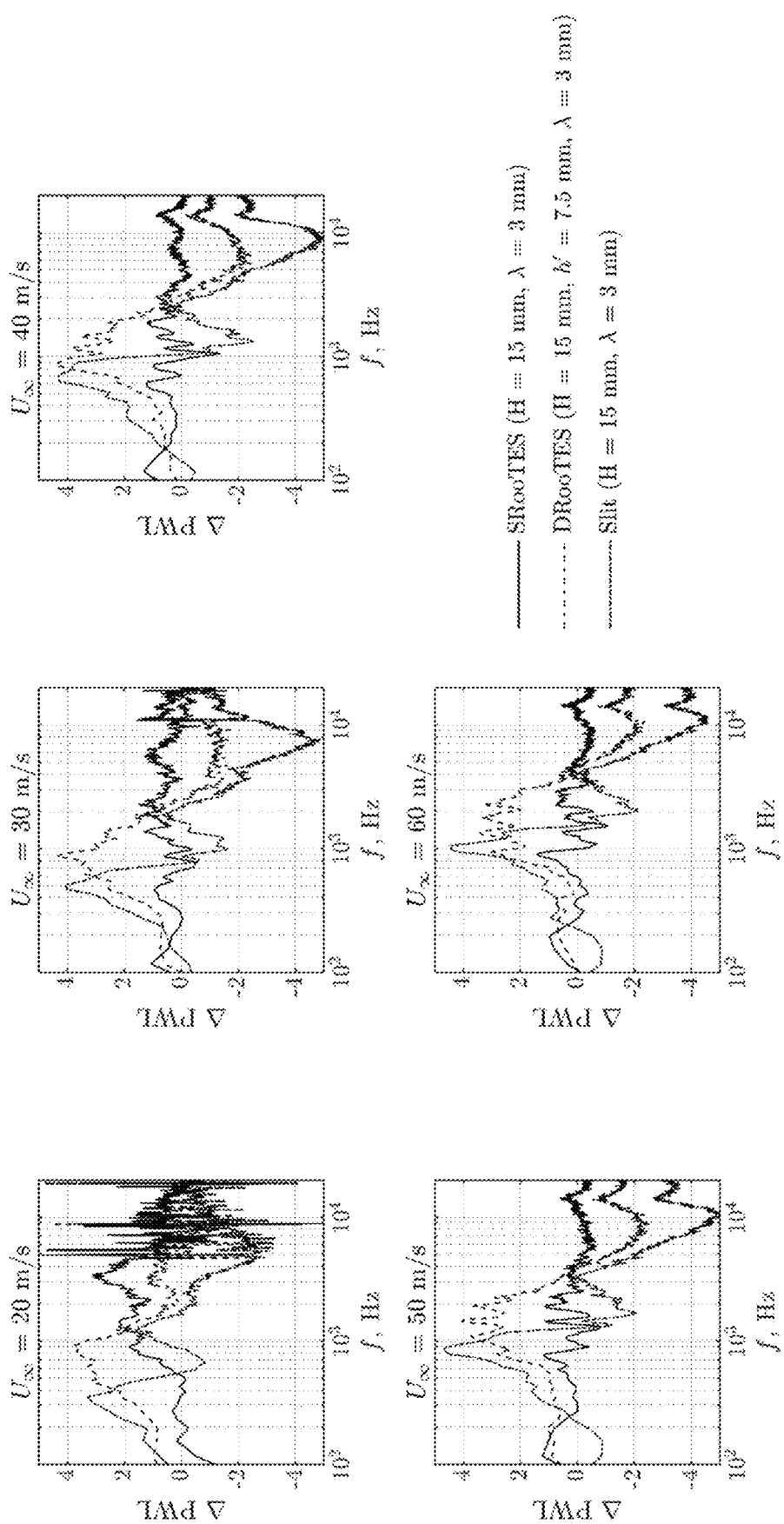
FIG. 9 depicts graphs comparing SRooTES, DRooTES and Slit trailing edges where amplitude, H, and wavelength, λ, were kept at 15 mm and 3 mm for ΔPWL, dB, at 20 m/s<$U_∞$<60 m/s.

FIG. 9 illustrates a comparison of the trailing edges at various freestream velocities at amplitude of H=15 mm. The best performer based on the maximum ΔPWL was the slit trailing edge case with reduction up to 4.8 dB in comparison to the baseline trailing edge. Alternatively, the DRooTES produced significant broadband noise reduction up to 4.5 dB across a significant greater frequency range, 100 Hz<f<4 kHz, at all freestream velocities in comparison to the slit trailing edge. This compares to the slit achieving reduction across a small frequency range of 100<f<1.5 kHz based on the freestream velocity. The worst case is the SRooTES which produced the least noise reduction at the low to mid frequency. However, at high frequency the SRooTES produced the least noise increase in comparison to DRooTES and slit trailing edge. At high frequency, the slit trailing edge produced the greatest noise increase, followed by DRooTES.

Figure 10:
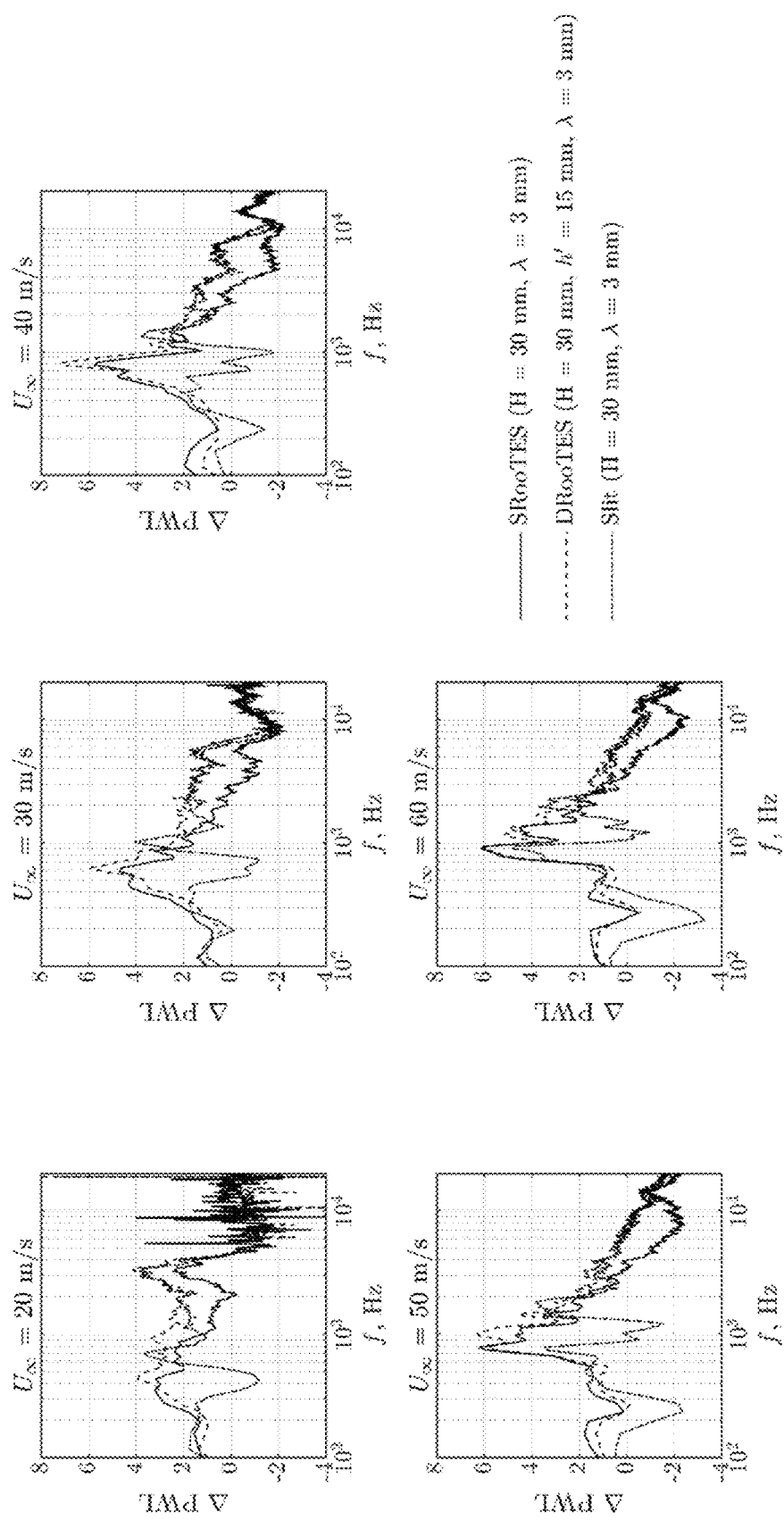
FIG. 10 depicts graphs comparing SRooTES, DRooTES and Slit trailing edges where amplitude, H, and wavelength, λ, were kept at 30 mm and 3 mm for ΔPWL, dB, at 20 m/s<$U_∞$<60 m/s.

FIG. 10 presents a comparison of the trailing edges at various freestream velocities at amplitude of H=30 mm. The best performer was the DRooTES with the largest noise reduction up to 7.2 dB. Furthermore, the DRooTES produced the smallest noise increase and noise reduction across all frequency ranges in comparison to baseline. The SRooTES produced similar noise reduction across the low to mid frequency range, however, it produced the greatest noise increase. The slit trailing edge produced significant reduction at specific frequencies at the low to mid frequency range and produced similar reductions to the DRooTES at high frequency.

In conclusion, the results shown in FIG. 9 and FIG. 10 clearly demonstrates the following:
1) DRooTES offers significant benefits at improving noise performance amongst all trailing edge cases, where DRooTES achieve noise reduction up to 4.5 dB and 7.2 dB for H=15 mm and H=30 mm respectively.
2) The optimization of geometry parameter, depending on the flow conditions, offer significant benefits in improving noise performance for all the trailing edge cases.

All optional and preferred features and modifications of the described embodiments and dependent claims are usable in all aspects of the invention taught herein. Furthermore, the individual features of the dependent claims, as well as all optional and preferred features and modifications of the described embodiments are combinable and interchangeable with one another.

The disclosures in UK patent application number 1906920.2, from which this application claims priority, and in the abstract accompanying this application are incorporated herein by reference.

What is claimed is:

1. A method for forming an add-on component for an aerofoil having a leading edge and a trailing edge, said component being formed in order to reduce the amplitude of sound produced at frequency $f_{peak}$ when air flows in a flow direction from the leading edge of the aerofoil over the trailing edge of the component at a freestream velocity $U_\infty$, the method including the steps of:
   (a) selecting a frequency $f_{peak}$ of sound that is to be reduced;
   (b) selecting a freestream velocity $U_\infty$ of air;
   (c) providing a component having a joining edge for joining to a trailing edge of an aerofoil and a trailing edge opposite said joining edge;
   (d) forming the trailing edge of the component into a plurality of pairs of peaks, each of said pairs having a first trough, a first peak, a second trough, a second peak, which is a greater distance from the joining edge than the first peak, and a third trough, wherein the first trough is on one side of the first peak, the second trough is between the first and second peak, and the third trough is on the other side of the second peak to the second trough;
   (e) wherein the first and third troughs of each pair of peaks lie substantially on a first axis, the second troughs of each pair of peaks lie substantially on a second axis, and the second peaks of each pair of peaks lie on a third axis;
   (f) and wherein the component is formed according to the formula:

$$h' = \frac{\hat{c} \cdot U_\infty \cdot \kappa}{2 f_{peak}},$$

where ĉ is from 0.4 to 0.8 and $$\kappa = \left(\frac{h''}{h'}\right)^{0.4}$$

where h' is the shortest distance between the first axis and the second axis, h" is the shortest distance between the $2^{nd}$ and $3^{rd}$ axis, $f_{peak}$ is the frequency of sound to be reduced and $U_\infty$ is the freestream velocity in the flow direction of air flowing over the trailing edge of the component.

2. The method of claim 1, wherein h'=h".

3. The method of claim 1, wherein the shortest distance from the first peak to the first axis is identical for each of said pair of peaks within the plurality of pairs.

4. The method of claim 1, wherein the third trough of first pair of peaks is the first trough of a second pair of peaks which is adjacent to said first pair of peaks.

5. A method for reducing the amplitude of sound produced at frequency $f_{peak}$ when air flows in a flow direction from the leading edge of an aerofoil over the trailing edge of an aerofoil at freestream velocity $U_\infty$, the method including the steps of:
   (a) forming an add-on component for an aerofoil according to a method as claimed in claim 1 and
   (b) attaching said component to said aerofoil.

6. The method of claim 5, including the steps of forming a plurality of components and attaching said plurality of components to said aerofoil.

7. The method of claim 6, wherein three components are formed and attached to said aerofoil, the first component proximate the tip of the aerofoil, the second component proximate the middle of the aerofoil and the third component proximate the other end of the aerofoil to the tip.

8. The method of claim 6, wherein said components are identical.

9. The method of claim 6, wherein said components have different values of h' and/or h".

10. A method for forming an add-on component for an aerofoil having a leading edge and a trailing edge, said component being formed in order to reduce the amplitude of sound produced at frequency $f_{peak}$ when air flows in a flow direction from the leading edge of the aerofoil over the trailing edge of the component at freestream velocity $U_\infty$, the method including the steps of:
   (a) selecting a frequency $f_{peak}$ of sound that is to be reduced;
   (b) selecting a freestream velocity $U_\infty$ of air;
   (c) providing a component having a joining edge for joining to a trailing edge of an aerofoil and a trailing edge opposite said joining edge;
   (d) forming the trailing edge of the component into a plurality of peaks separated by troughs with each peak being connected to each trough on either side of the peak by a wall which is substantially perpendicular to the trailing edge, wherein the peaks each have a width (a) which is substantially parallel to the trailing edge and the troughs each have a width (W) which is substantially parallel to the trailing edge, said width also being the gap between adjacent peaks, wherein the peaks lie substantially on a first axis and the troughs lie substantially on a second axis and wherein the shortest distance from the first axis to the second axis is defined as H,
   (e) and wherein the component is formed according to the formula:

$$H = \frac{\hat{c} \cdot U_\infty}{2 f_{peak}},$$

where ĉ is from 0.4 to 0.8.

11. A method as claimed in claim 10, wherein the ratio of the gap between adjacent peaks (W) and the spanwise correlation length scale of the turbulent eddies ($L_y$) is governed by the expression $0.2 \leq W/L_y \leq 0.5$.

12. A method for reducing the amplitude of sound produced at frequency $f_{peak}$ when air flows in a flow direction from the leading edge of an aerofoil over the trailing edge of an aerofoil at freestream velocity $U_\infty$, the method including the steps of:
   (a) forming an add-on component for an aerofoil according to a method as claimed in claim 10 and
   (b) attaching said component to said aerofoil.

13. The method of claim 12, including the steps of forming a plurality of components and attaching said plurality of components to said aerofoil.

14. The method of claim 13, wherein three components are formed and attached to said aerofoil, the first component proximate the tip of the aerofoil, the second component proximate the middle of the aerofoil and the third component proximate the other end of the aerofoil to the tip.

15. The method of claim 13, wherein said components are identical.

16. The method of claim 13, wherein said components have different values of H.

17. The method of claim 2, wherein the shortest distance from the first peak to the first axis is identical for each of said pair of peaks within the plurality of pairs.

18. The method of claim 2, wherein the third trough of first pair of peaks is the first trough of a second pair of peaks which is adjacent to said first pair of peaks.

19. The method of claim 3, wherein the third trough of first pair of peaks is the first trough of a second pair of peaks which is adjacent to said first pair of peaks.

20. The method of claim 7, wherein said components are identical or have different values of h' and/or h".

\* \* \* \* \*

UNITED STATES PATENT AND TRADEMARK OFFICE
CERTIFICATE OF CORRECTION

PATENT NO. : 11,808,246 B2
APPLICATION NO. : 17/526808
DATED : November 7, 2023
INVENTOR(S) : Tze Pei Chong and Philip Charles Woodhead Page 1 of 1

It is certified that error appears in the above-identified patent and that said Letters Patent is hereby corrected as shown below:

In the Claims

Column 15, Claim 1, Line 37, should read "where $\hat{c}$ is from 0.4 to 0.8 and".

Signed and Sealed this
Thirtieth Day of July, 2024

Katherine Kelly Vidal
*Director of the United States Patent and Trademark Office*